Alma Bedford.

Detachable Thill or Pole Coupling.

116666

PATENTED JUL 4 1871

Witnesses.
C. H. Poole
Wm. T. Hutchinson

Inventor.
A. Bedford
By J. B. Woodruff, Attorney

UNITED STATES PATENT OFFICE.

ALMA BEDFORD, OF COLD WATER, MICHIGAN.

IMPROVEMENT IN THILL-COUPLINGS.

Specification forming part of Letters Patent No. 116,666, dated July 4, 1871; antedated June 29, 1871.

*To all whom it may concern:*

Be it known that I, ALMA BEDFORD, of the city of Cold Water, in the county of Branch and State of Michigan, have invented certain new and useful improvements in a detachable joint for pole and thill-coupling for land-travel vehicles, and the method of supporting the same in any desired position; and the following is a full, clear, and exact description of the same, reference being had to the accompanying drawing making a part of this specification, in which—

Figure 1:
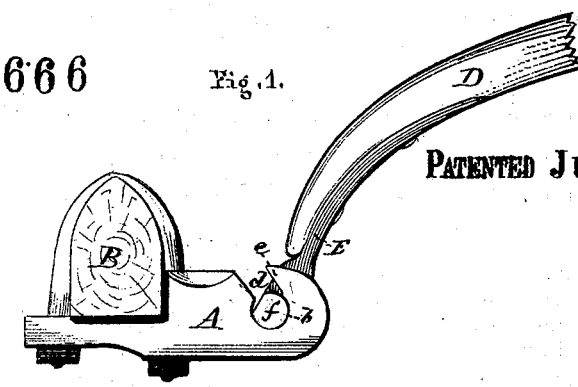
Figure 2:
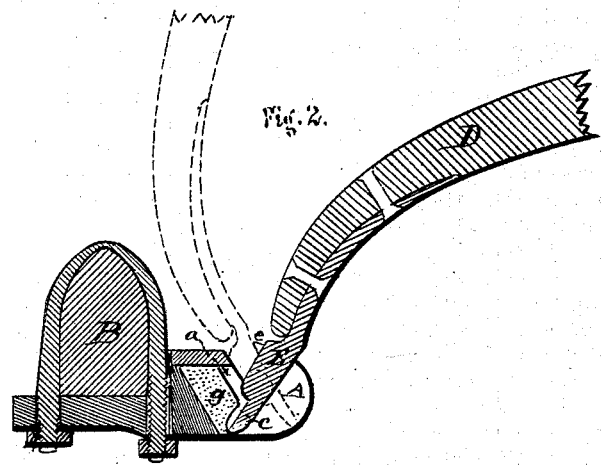
Figure 3:
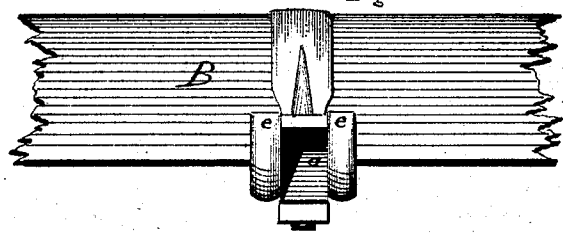
Figure 4:
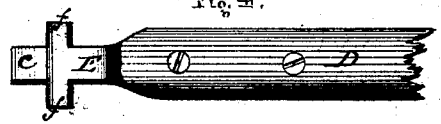

Figure 1 represents a side view of the clip and thill-strap as attached to thill and axle, showing the form of the draft-pin and the opening to receive it. Fig. 2 shows a longitudinal section through the same, the thill supported in a position for hitching to the elevated position for detaching the thill, shown in dotted lines. Fig. 3 is a front view of the clip-iron as attached to a section of the axle, showing the recess for securing a yielding substance, a spring for supporting the thills, or a pole in any desired position. Fig. 4 shows a top view of the thill-iron strap-coupling, with a piece of thill attached, as detached from the vehicle.

My improvements relate to land conveyances and the convenience of detaching shafts, thills, or the pole of wagons, carriages, sleighs, &c., for changing from one to two horses, or putting up in the carriage-house. My invention consists in the construction of the thill-iron with its projecting lip in the rear, and the form of the draft-pin and opening in the clip-iron to receive it, as arranged in combination with the recess and yielding spring, or substantially secured therein to hold the pole or thill in an elevated position, so as to relieve the weight from the neck-yoke or harness and be in a position for hitching a horse or span of horses to the vehicle without having to raise them off the ground.

To enable others to make and use my improved detachable thill or pole-coupling, I will describe it more fully, referring to the drawing and to the letters marked thereon.

The clip or clutch-iron A may be wrought or of malleable cast-iron, and secured to the axle B by a strap and screw-nuts in the usual manner. The block or front portion of the clip-iron is provided with a space or recess, $a$, extending back from the bolt-hole, or the opening $b$ on its under side, in which to secure a piece of vulcanized India rubber or other yielding substance for the projecting lip $c$ to lift against and hold the thill D in an elevated position. The bolt-holes $b\ b$ have opening, $d\ d$, from the top, which incline back so that they form hooks $e\ e$. The openings $d.d$ are made narrower than the diameter of the bolt-holes $b$, so that the draft-pins or the projecting pintles $f f$ on both sides of the thill-iron E have to be flattened on the top side or surface to allow it to enter the clip A when the thills are elevated to a vertical position; and when they are let down in a position for hitching they are secure from coming out, and are also held from falling below the required place to enter the tug-straps. The projecting lip $c$ in the rear of the draft-pin or pintles $f f$ will bear up against the lower end of the yielding substance or spring $g$ so as to relieve the weight of the shafts or thills D from bearing on the horse, while they will move up or down sufficiently to accommodate all necessary motion of traveling.

What I claim as my invention, and desire to secure by Letters Patent, is—

Pole or thill-couplings for vehicles, the joint of which is provided with a projecting lip, $c$, on the thill-iron E extending back of the draft-pin or pintles $f f$, in combination with the yielding substance $g$ secured in the recess $a$ of the clip-iron A for supporting the thills or pole in any desired position, substantially as herein shown and descibed.

A. BEDFORD.

Witnesses:
J. B. WOODRUFF,
EDM. F. BROWN.